June 6, 1961
PHILIP A. DI GIORGIO
NOW BY CHANGE OF NAME
PHILIP D. GEORGE
FUEL ADDITIVES
Filed Nov. 7, 1951
2,986,875
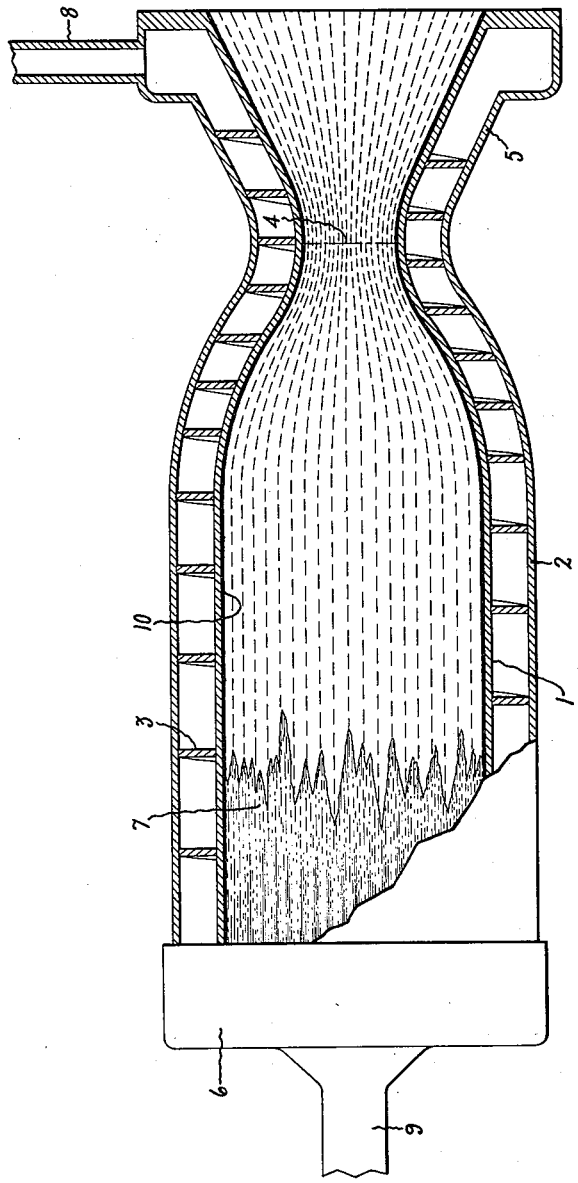
Inventor:
PHILIP D. GEORGE
by Paul A. Frank
His Attorney.

United States Patent Office 2,986,875
Patented June 6, 1961

2,986,875
FUEL ADDITIVES
Philip A. Di Giorgio, Schenectady, N.Y., now by change of name Philip D. George, assignor to General Electric Company, a corporation of New York
Filed Nov. 7, 1951, Ser. No. 255,262
9 Claims. (Cl. 60—35.4)

This invention relates to jet propulsion systems. More particularly, it relates to such systems in which there is means provided in the fuel for reducing the heat transfer rate to the combustor walls whereby the walls are rendered resistant to erosive conditions and are relatively long-lived.

The term "jet propulsion system" as used herein includes all so-called reaction type motors or engines wherein the mechanical driving thrust or force is derived from the action of equal or opposite forces arising between the motor or engine body and the body or mass of the reactants by virtue of the change in momentum of the reactants attained during the conversion of the reactants into gaseous products of greater volume than that occupied by the reactants, as distinguished from internal combustion engines of the reciprocating type. Examples of jet propulsion devices encompassed by the present invention are rocket motors, ram jets, turbojets, pulse jets, and turbo-prop-jets among others.

One of the primary problems in the design of jet propulsion or reaction type motors is that of maintaining the motor walls at relatively low temperatures with respect to the extremely high temperatures prevailing in the central portion of the combustion zone so that the walls do not rapidly burn out or erode excessively and fail. During the normal operation of a rocket motor, for example, the temperature of the combustion gases at the center of the motor is of the order of 3000° C. or even higher, with the temperature decreasing gradually toward the walls. As a practical matter, it is of the utmost importance that the temperature gradient between the hot center core and the walls be as great as feasible or that the wall temperature be as low as possible.

In an effort to protect the combustor walls against disintegration, it has been customary to build the walls of high-temperature-resisting materials and to circulate a coolant about the walls. This coolant may be one or both of the reacants later used in propelling the vehicle, or it may be a separate cooling medium such as water and the like. This method of cooling, while effective, does not go far enough in protecting the combustion chamber walls.

It has also been known to introduce a part of the fuel into the combustor through holes in the liner walls so that the vaporization of this part of the fuel adsorbs heat near the walls and keeps the latter cool. This method of cooling is known variously as spray-cooling, film-cooling and transpiration or sweat-cooling. Like the preceding method of cooling, this means of cooling is effective only to a certain degree. It has also been proposed to provide ceramic linings for the combustion chamber walls. While such linings are effective in reducing the heat transfer rate to the walls, they are easily eroded away and destroyed by the hot exit gases.

A more recently developed means of protecting the walls of jet propulsion combustors is that described in copending application Serial No. 794,672, E. H. Hull et al., filed December 30, 1947, now abandoned, and assigned to the same assignee as the present invention. In the copending application it is proposed that there be introduced into the combustion zone a substance or substances affording therein an inorganic, non-combustible residue which is non-gaseous at temperatures adjacent the walls of the combustion zone. The residue produced is in the form of a rapidly moving cloud or screen of solid or liquid particles, most of which is exhausted from the combustor, with a small part depositing on the walls of the combustor as a protective coating. The rapidly moving particles form a protective screen within the combustion zone, reflecting the heat radiated from the hot central portion thereof away from the walls. That part of the screen which deposits on the walls serves as a thermal insulating coating to further protect the walls. The material may be introduced directly into the combustion zone or through its suspension or solution in one or both of the reactants.

The additive materials of the copending application comprise oxides or oxide-producing materials, the latter being typified by materials such as ethyl orthosilicate. While suspensions of oxides or oxide-producing material in the reactants or solutions of such materials are usable if freshly prepared, it has been found that the suspended material tends to settle out and clog supply lines. It has also been observed that soluble materials such as ethyl orthosilicate are very sensitive to moisture and tend to gel upon aging when added to alcohol-water fuels and hydrocarbon fuels widely used in the reaction motor field. The presence of flux or acid in the fuel promotes such gelation. Additionally, upon standing, the alcohol or hydrocarbon in such fuel-oxide producing material combination tends to evaporate, causing the added material to irreversibly separate out in fuel lines, valves, etc.

The copending application also mentions that oxide-producing material may be prepared from a by-product of the preparation of methylchlorosilanes as described in Patent 2,380,995—Rochow, issued August 7, 1945, and assigned to the same assignee as the present invention. After the removal of excess methyl chloride and isolation of methylchlorosilanes by distillation from the reaction product of silicon and methyl chloride in the presence of a catalyst such as copper, there remain in the still-pot higher molecular weight organo-substituted silicon compounds containing hydrolyzable chlorine. By reaction with alcohol this chlorine can be removed in the form of hydrochloric acid to leave alkoxy-substituted derivatives of the silicon compound, which, when introduced into the combustion zone of a jet propulsion engine, produce a residue of silica therein. While such silicon-containing materials are useful in a sense, they are deficient in that, being a by-product residue, they are variable in composition from lot to lot and do not lend themselves to such precise composition control as will give reproducible results in actual use. These materials are further varying insofar as their solubility in the fuel reactant is concerned.

In my copending application, Serial No. 255,261, filed of even date herewith, I have described a fuel additive composed of methylpolysiloxanes whereby hydrocarbon fuels and alcohol-water fuels containing up to about 10 percent water may be treated to give a jet propulsion fuel which will protect the walls of the combustion chamber from burnout.

An object of this invention is to provide improved means for producing a heat transfer reducing medium in the combustion chambers of jet propulsion systems.

Another object of this invention is to provide new and improved materials which will provide inorganic, non-combustible residues in jet propulsion combustors or reaction motors, said materials being non-gaseous at temperatures prevailing at the walls of the combustors.

Another object of this invention is to provide t-alkyl-n-alkyl orthosilicates as additives for jet propulsion fuels.

Other objects will become apparent and the invention will be better understood from a consideration of the following description and the drawing in which the single figure shows a rocket motor as typical of jet propulsion units.

As explained above, the ethyl orthosilicate disclosed in copending application, Serial No. 794,672, E. H. Hull et al., now abandoned, is not a satisfactory additive under rigorous conditions. My copending application directed to methylpolysiloxanes as fuel additives remedied the defects present in ethyl orthosilicate.

I have now discovered that t-alkyl-n-alkyl orthosilicates also remedy the defects present in ethyl orthosilicate and provide a readily available fuel additive which will stand up under rigorous climatic conditions.

Mixed t-alkyl-ethyl orthosilicates are produced by the interaction of ethyl orthosilicate and a tertiary alcohol in the presence of a basic catalyst with provision for continuous removal of ethyl alcohol as it is formed. The reaction proceeds as follows:

$$(EtO)_4Si + ROH \rightarrow (RO)_xSi(OEt)_{4-x} + EtOH$$

In the above reaction, R is a tertiary alkyl group. The above reaction is applicable to produce mixed orthosilicates containing t-alkoxy and n-alkoxy groups. The value $x$ may be a number from 1 to 4. However, in actual practice the reaction favors formation of the monotertiary alkoxy compound. Some of the ditertiary alkoxy compound is formed and also a small quantity of the tritertiary alkoxy compound. Tetra-t-alkyl orthosilicates, while probably formed in trace amounts, are not isolated.

In general, the procedure for making these alkoxysilanes is as follows:

The reaction mixture, consisting of several small pieces of sodium and equimolar amounts of ethyl orthosilicate and the appropriate tertiary alcohol, for example, tertiary butyl, tertiary amyl, or tertiary hexyl alcohol, is heated and the resulting reflux is rectified through an efficient column. Distillate is removed slowly at the boiling point of ethyl alcohol until the refluxing slows and the weight of distillate approximately equals the theoretical amount of ethyl alcohol expected. The reaction mixture is allowed to cool, washed thoroughly with water, dried, and fractionally distilled in an efficient column. The t-alkyl-ethyl orthosilicates thus obtained are water-white mobile liquids having an odor similar to the alcohol from which they are prepared.

EXAMPLE 1

*Synthesis of t-butoxyethoxy silanes (t-butyl-ethyl orthosilicates)*

In a round-bottom flask was placed 1100 grams, 5.3 mols, of ethyl orthosilicate and 392 grams, 5.3 mols, of t-butyl alcohol. Several pea-sized chunks of sodium were added and the reaction flask was attached to a glass helix-packed rectification column having an estimated efficiency of 20 theoretical plates. As heat was applied to the reaction vessel, the sodium went into solution and reflux appeared at the head of the column. Distillate was taken off at the boiling point of ethyl alcohol over a period of about 6 hours. After 274 grams of distillate boiling at about 80° C. had been collected, its $n_D^{20}$ was found to be 1.3678. This indicated that the distillate contained about 25 percent t-butyl alcohol. Therefore, 100 grams more of t-butyl alcohol was added to the reaction mixture and rectification was continued until a total of 362 grams of distillate had been collected. The $n_D^{20}$ was now 1.3699 corresponding to about 30 percent t-butyl alcohol. Thus, the distillate contained about 109 grams of t-butyl alcohol and about 253 grams of ethyl alcohol. The theoretical yield of ethyl alcohol based on t-butyl alcohol not recovered was 238 grams.

The crude produced in the still-pot was washed, dried, and fractionally distilled to separate t-butoxytriethoxy silane and di-t-butoxydiethoxysilane from unreacted ethyl orthosilicate, and from each other. The production of t-butoxytriethoxysilane was 450 grams or 1.9 mols. The production of di-t-butoxydiethoxysilane was 100 grams or 0.38 mol.

EXAMPLE 2

*Synthesis of t-amoxyethoxysilanes (t-amyl-ethyl orthosilicates)*

The synthesis of t-amoxyethoxysilanes was conducted in the same manner and with the same apparatus as described for t-butoxyethoxysilanes. Five mols each of ethyl orthosilicate and t-amyl alcohol were used—1040 grams and 440 grams, respectively. A total of 233 grams of ethyl alcohol distillate was obtained.

The final fractional distillation yielded 500 grams of t-amoxytriethoxysilane. This was 2.0 mols. There was also a yield of 200 grams, or 0.72 mol, of di-t-amoxydiethoxy-silane.

The procedure set forth in Example 1 may also be used to produce t-alkyl-ethyl orthosilicates from tertiary hexyl alcohol, tertiary heptyl alcohol, and even higher alcohols. However, silicon is the important ingredient in the additives which are the subject matter of this invention, and as the alcohol chain length increases, the percentage of silicon decreases. Accordingly, the longer chain tertiary alkyl compounds are not as desirable as the shorter chain compounds.

The t-alkyl-ethyl orthosilicates described above may be used not only in non-polar fuels such as the various petroleum hydrocarbons, but also in polar fuels such as alcohol and alcohol-water mixtures in amounts of about 10 percent by weight. The t-alkyl-n-alkyl orthosilicates do not separate out from alcohol-water mixtures containing up to about 10 percent water even at temperatures of —60° C. or less, after being stored for long periods of time at room temperature or below. The materials themselves may also be stored alone at such low temperatures without detrimental results. This performance is far superior to that obtainable from ethyl orthosilicate or other straight-chain orthosilicates such as n-butyltriethyl silicate or di-n-butyldiethyl silicate.

While the pure or substantially pure t-alkyl-n-alkyl orthosilicates discussed above are very useful, practical considerations such as their cost and the difficulty of obtaining them in pure form, make it advisable that mixtures of such materials be used. Thus, in producing t-butyl-ethyl orthosilicates it is desirable from economic considerations that the t-butyltriethyl silicate have the di-t-butyldiethyl silicate mixed with it in order to avoid the necessity of separating the two. The above-described materials may be advantageously used in alcohol or alcohol-base fuels in amounts ranging from 1 percent to 20 percent by weight. Furthermore, the alcohol-base fuel may contain up to about 25 percent by weight of water. The preferred range of additive concentration is from 5 percent to 15 percent by weight and the specific preferred additive content is 10 percent by weight.

By way of illustration, and in order to facilitate an understanding of the operation of the invention, a specific application of the method of my invention in the operation of a rocket motor is shown in the accompanying drawing. The drawing shows somewhat schematically a rocket motor in which a portion of the inorganic non-combustible residue is being projected as a stream of moving particles through the combustion zone with the combustion gases, and another portion is being deposited as thermal insulating coating on the walls of the motor exposed to the combustion gases.

The motor comprises an inner wall 1 and an outer wall 2 defining an annular cooling chamber. A helical member 3 located in the cooling chamber between the walls 1 and 2 provides a helical circumferential path for movement of the cooling fluid around the outside of the inner wall of the motor. Near one end of the motor the walls are restricted to form the throat 4 and an expanded section 5. At the opposite end of the walls an injection head 6 is provided for admitting the propellent fluids to a combustion chamber 7. The fuel containing t-alkyl-n-alkyl orthosilicate material affording an inorganic non-combustible residue, which is non-gaseous at temepratures prevailing adjacent the walls defining the combustion zone, enters the motor through an inlet 8 and, serving as the cooling fluid, passes through the annular chamber between the inner and outer motor walls into the injection head and then into the combustion chamber. The oxidizer is admitted to the injection head through an inlet tube 9. As the fuel and the oxidizer react in the combustion chamber, the combustion gases pass at high velocity through the throat of the motor carrying with them a portion of the non-combustible residue in the form of small particles which reflect the heat radiated from the extremely hot central portion of the combustion zone away from the walls exposed to the combustion gases. The portion of the residue which is not exhausted with the combustion gases is deposited as a coating 10 on the inner surface of the motor. The coating 10 affords a thermal insulating coating which protects the metal wall 1 from direct contact with the combustion gases.

The t-alkyl-n-alkyl orthosilicates described herein contain up to 11.9 percent silicon. All have remained clear and stable after being stored for periods in excess of one year. Exposure to cold of the order of −60° C. does not affect them.

While the present invention has been described with reference to particular embodiments thereof, it will be understood that numerous modifications may be made by those skilled in the art without actually departing from the spirit of the invention. I, therefore, aim in the appended claims to cover all such equivalent variations as come within the true spirit and scope of the foregoing disclosure.

What I claim as new and desire to secure by Letters Patent of the United States is:

1. A method of operating a jet propulsion system in which an inorganic non-combustible residue is deposited as a thermal insulating coating on the walls of said system, which method comprises igniting a fuel mixture of a combustible liquid selected from the group consisting of a petroleum hydrocarbon fraction and an alcohol-water mixture having fewer than 3 carbon atoms, and less than 20% but more than 1% of a monomeric mixed lower tertiary-alkyl, lower normal-alkyl orthosilicate.

2. The method of claim 1 in which the tertiary orthosilicate is t-butyl-triethyl orthosilicate.

3. The method of claim 1 in which the tertiary orthosilicate is di-t-butyl-diethyl orthosilicate.

4. The method of claim 1 in which the tertiary orthosilicate is t-amyl-triethyl orthosilicate.

5. The method of claim 1 in which the tertiary orthosilicate is di-t-amyl-diethyl orthosilicate.

6. The method of claim 1 in which the orthosilicate is t-hexyl-triethyl orthosilicate.

7. The method of claim 1 in which the combustible liquid is a petroleum fraction.

8. The method of claim 1 in which the combustible liquid is an alcohol-water mixture containing less than 25% water.

9. The method of claim 1 in which the tertiary orthosilicate is present to the extent of about 10%.

References Cited in the file of this patent

UNITED STATES PATENTS

| | | |
|---|---|---|
| 2,407,037 | Sowa | Sept. 3, 1946 |
| 2,432,109 | Zisman et al. | Dec. 9, 1947 |
| 2,563,305 | Britton et al. | Aug. 7, 1951 |
| 2,566,364 | Pedlow et al. | Sept. 4, 1951 |
| 2,566,365 | Pedlow et al. | Sept. 4, 1951 |
| 2,566,956 | Pedlow et al. | Sept. 4, 1951 |

FOREIGN PATENTS

| | | |
|---|---|---|
| 445,506 | Great Britain | Apr. 14, 1936 |

OTHER REFERENCES

Journal of the American Rocket Society, No. 72, December 1947, page 32.

Hackh's Chemical Dictionary, 3rd Edition (1944), page 475.